United States Patent
Osborne et al.

(10) Patent No.: US 6,687,833 B1
(45) Date of Patent: Feb. 3, 2004

(54) SYSTEM AND METHOD FOR PROVIDING A NETWORK HOST DECOY USING A PSEUDO NETWORK PROTOCOL STACK IMPLEMENTATION

(75) Inventors: Anthony Charles Osborne, Sydney (AU); Bruce Robert Leidl, Calgary (CA); Gerhard Eschelbeck, Peuerbach (AT); Andrea Emilio Villa, Ben Lomond, CA (US)

(73) Assignee: Networks Associates, Inc., Santa Clara, CA (US)

( * ) Notice: Subject to any disclaimer, the term of this patent is extended or adjusted under 35 U.S.C. 154(b) by 0 days.

(21) Appl. No.: 09/405,652

(22) Filed: Sep. 24, 1999

(51) Int. Cl.$^7$ ................................................ H04L 9/00
(52) U.S. Cl. ....................... 713/201; 713/151; 713/152; 713/154; 713/162
(58) Field of Search ................................ 713/152, 154, 713/166, 151, 201; 380/256

(56) References Cited

U.S. PATENT DOCUMENTS

| | | | |
|---|---|---|---|
| 5,432,932 A | | 7/1995 | Chen et al. |
| 5,655,081 A | | 8/1997 | Bonnell et al. |
| 5,781,550 A | * | 7/1998 | Templin et al. .............. 370/401 |
| 5,870,550 A | * | 2/1999 | Wesinger et al. ............ 709/218 |
| 5,878,231 A | * | 3/1999 | Baehr et al. ................. 709/245 |
| 5,913,024 A | * | 6/1999 | Green et al. ................. 713/200 |
| 5,924,127 A | * | 7/1999 | Kawamoto et al. .......... 711/207 |
| 5,958,010 A | | 9/1999 | Agarwal et al. |
| 6,332,163 B1 | | 12/2001 | Bowman-Amuah |
| 6,381,646 B2 | * | 4/2002 | Zhang et al. ................ 709/227 |

OTHER PUBLICATIONS

M. Pietrek, "Learn System–Level Win32 coding Techniques by Writing an API Spy Program," vol. 9, No. 12, Microsoft Systems Journal, Microsoft Press (Dec. 1994).

T. Fraser et al., "Hardening COTS Software with Generic Software Wrappers," Proc. Of the 1999 IEEE Symp. On Security and Privacy, IEEE, Inc. (1999).

A. Osborne & J.D. Myers, "A Methodical Approach to Remote IP Stack Identification," Network Associates, Inc., Santa Clara, California (1999).

* cited by examiner

Primary Examiner—Justin T. Darrow
Assistant Examiner—Kambiz Zand
(74) Attorney, Agent, or Firm—Patrick J. S. Inouye; Christopher J. Hamaty

(57) ABSTRACT

A system and method for providing a network host decoy on a virtual host using a pseudo implementation of a network protocol stack are described. A hierarchical network protocol stack is functionally defined and includes a plurality of communicatively interfaced protocol layers. A request frame originating from a remote host is received. The request frame includes a plurality of recursively encapsulated data segments which each correspond to a successive protocol layer in the network protocol stack. At each protocol layer, processing a header associated with the encapsulated data segment demultiplexs each encapsulated data segment in the request frame. Any requested network service is performed and any recursively encapsulated portion is forwarded to the next successive protocol layer. A plurality of pseudo data segments corresponding to each of the protocol layers in the network protocol stack is formed. Each pseudo data segment includes a header and data portion. The header includes network protocol stack characteristics for a pseudo host different than the network protocol stack characteristics for the virtual host. Each of the pseudo data segments within a response frame is recursively encapsulated. A network address for the pseudo host different than the network address for the virtual host is inserted into the response frame. The response frame is sent to the remote host.

33 Claims, 11 Drawing Sheets

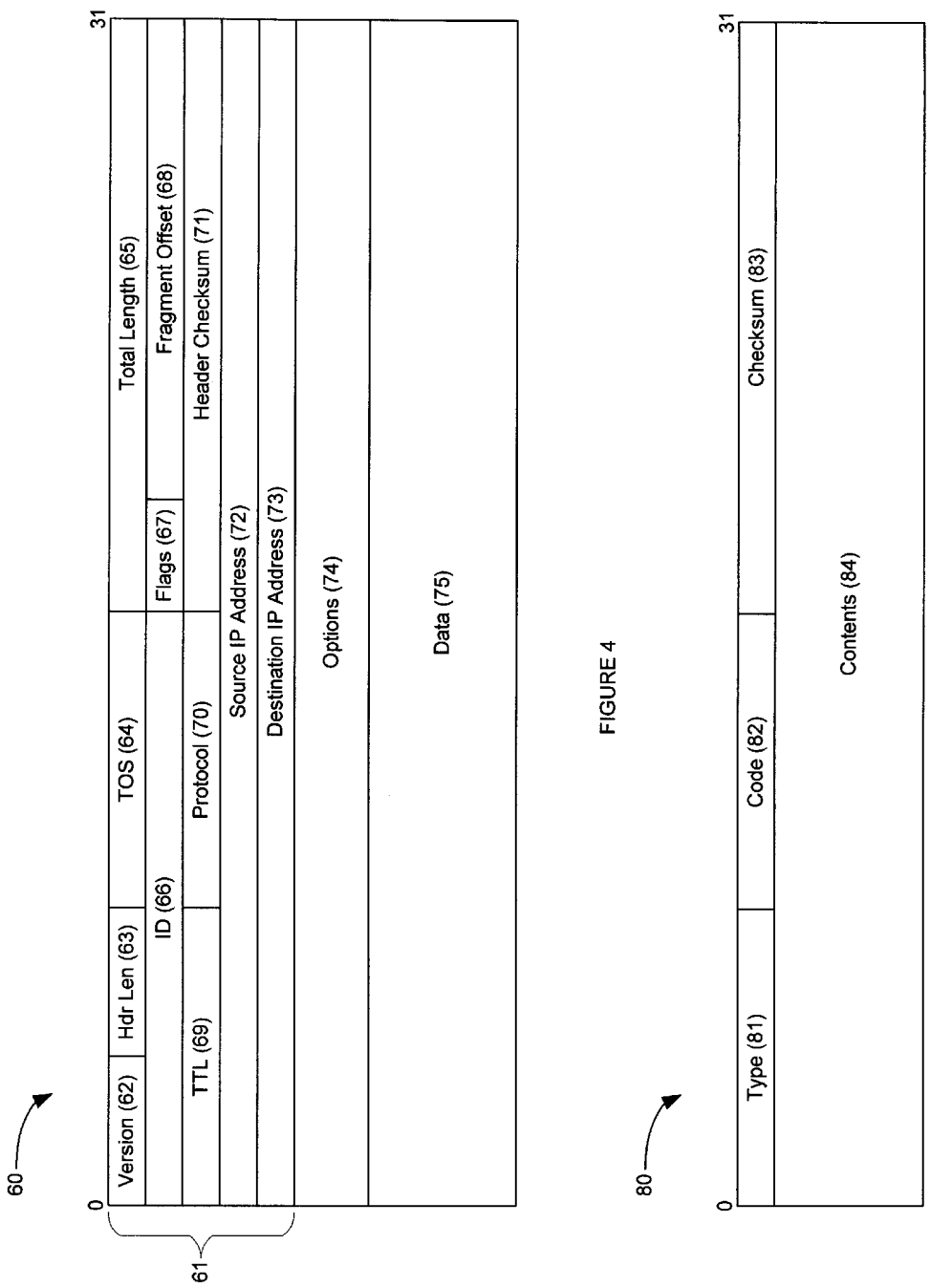

SYSTEM AND METHOD FOR PROVIDING A NETWORK HOST DECOY USING A PSEUDO NETWORK PROTOCOL STACK IMPLEMENTATION

CROSS-REFERENCE TO RELATED APPLICATION

This patent application is related to a commonly-assigned U.S. patent application, entitled "System And Method For Remotely Identifying An Operating System Based On A Network Layer Stack Implementation," filed on Sep. 24, 1999, pending, the disclosure of which is incorporated herein by reference.

FIELD OF THE INVENTION

The present invention relates in general to providing a network host decoy, and, in particular, to a system and method for providing a network host decoy using a pseudo network protocol stack implementation.

BACKGROUND OF THE INVENTION

Data information networks interconnecting a wide range of computational resources have become a mainstay of corporate computing environments. Most major corporations presently maintain numerous host computer systems that are interconnected internally over an intranetwork to which individual workstations and network resources are connected. These intranetworks make legacy databases and information resources widely available for access and utilization throughout the corporation. These same corporate resources can also be interconnected to a wide area public information internetwork, such as the Internet, to enable outside users to remotely access select corporate resources for the purpose of completing limited transactions or data transfer.

Due to the inherent risks of making such internal corporate systems available to a wider audience of internal and external users, maintaining network security has become a paramount concern. Network security is particularly crucial where the host systems are accessible by, and therefore vulnerable to, both internal workstations and external systems gaining access through the various intra- and internetwork connections. Protecting a network against attack by illicit users is extremely difficult due to the various machine types, operating systems, software patch levels, and system configurations. The complexity increases dramatically as the number of interconnected systems grows.

One source of complexity arises as a result of the various network protocol implementations used by each system and network device. Most current internetworks and intranetworks are based on the Transmission Control Protocol/Internet Protocol (TCP/IP) suite, such as described in W. R. Stevens, "TCP/IP Illustrated," Vol. 1, Ch. 1, Addison-Wesley (1994), the disclosure of which is incorporated herein by reference. Computer systems and network devices employing the TCP/IP suite implement a network protocol stack, which includes a hierarchically structured set of protocol layers. Each protocol layer performs a set of pre-defined functions as specified by the official TCP/IP standards set forth in applicable Requests for Comment (RFC). Numerous network security concerns arise due to the basic structuring of and differences in how each protocol layer has been implemented.

For instance, firewalls situated between the internal intranetwork and the external internetwork provide some level of active security against externally originating network "attacks." Typically, these systems monitor and detect signature patterns in individual packets in the incoming data stream to identify a potential security threat. However, due to the separation of functionality between the individual network layers, an attack signature can be disguised or distributed over a series of packets to evade detection and thereby defeat the security provided the firewall. Moreover, active security begins to fail as network traffic increases and the active security monitors become overwhelmed and saturated by packet data.

Therefore, there is a need for a passive network security system capable of diverting and tracking potential attacks for use in a system implementing a network protocol stack. Such a system should be capable of intercepting attacks originating from both external sources and illicit internal systems and be capable of simulating the network protocol stack implementation of a plurality of virtual hosts and network devices.

SUMMARY OF THE INVENTION

The present invention provides a system and method for providing a network host decoy using a pseudo network protocol stack implementation. Individual nuances particular to a given platform and operating system are introduced in a protocol stack specific manner.

An embodiment of the present invention is a system and method for providing a network host decoy on a virtual host using a pseudo implementation of a network protocol stack. A hierarchical network protocol stack is functionally defined and includes a plurality of communicatively interfaced protocol layers. A request frame originating from a remote host is received. The request frame includes a plurality of recursively encapsulated data segments which each correspond to a successive protocol layer in the network protocol stack. At each protocol layer, processing a header associated with the encapsulated data segment demultiplexes each encapsulated data segment in the request frame. Any requested network service is performed and any recursively encapsulated portion is forwarded to the next successive protocol layer. A plurality of pseudo data segments corresponding to each of the protocol layers in the network protocol stack is formed. Each pseudo data segment includes a header and data portion. The header includes network protocol stack characteristics for a pseudo host different than the network protocol stack characteristics for the virtual host. Each of the pseudo data segments within a response frame is recursively encapsulated. A network address for the pseudo host different than the network address for the virtual host is inserted into the response frame. The response frame is sent to the remote host.

One benefit of the present invention is a better deception. By analyzing the type of destination host sought, the invention provides a network host or device decoy which appears more convincing and realistic to the would-be attacker. Consequently, detection of the pseudo host is minimized.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a data structure showing the contents of an Internet Protocol (IP) datagram;

FIG. 5 is a data structure showing the contents of an Internet Control Message Protocol (ICMP) message;

DETAILED DESCRIPTION

Figure 1:
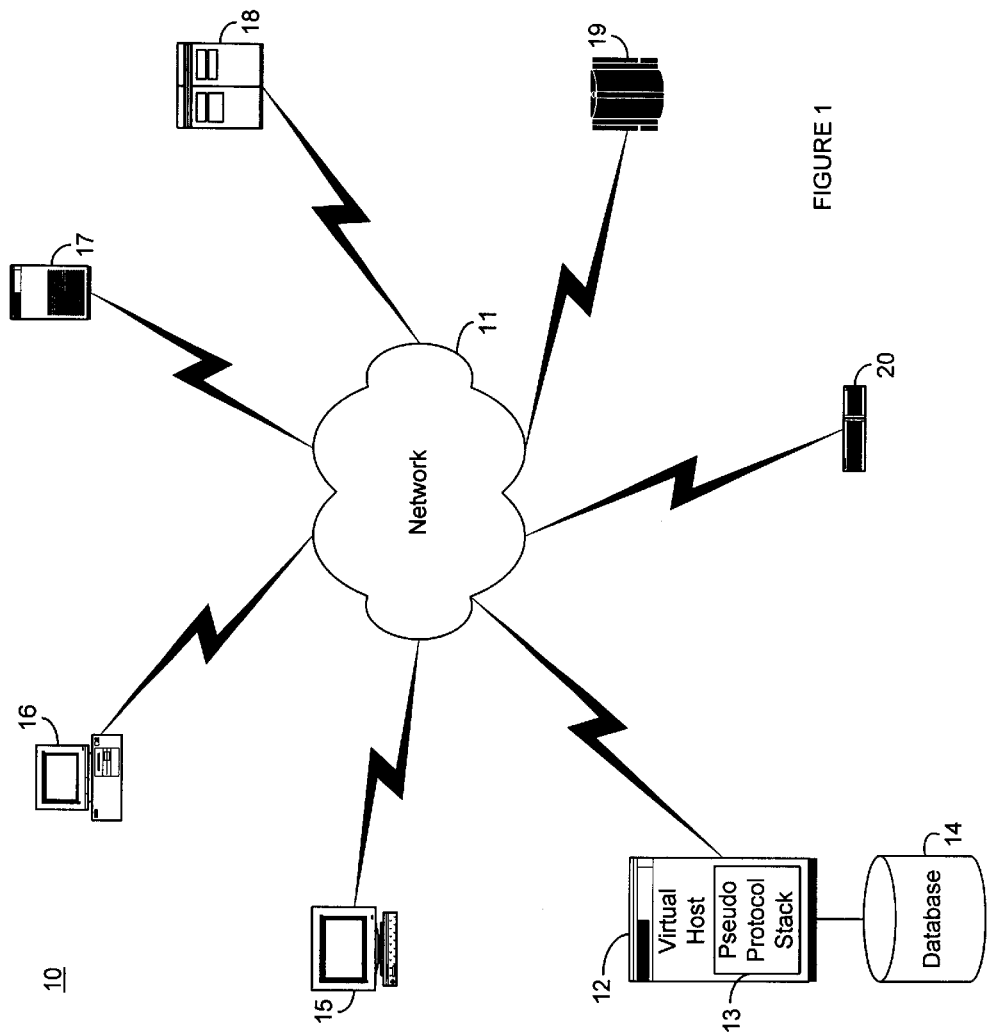
FIG. 1 is a functional block diagram showing a system for providing a network host decoy using a pseudo network protocol stack implementation in accordance with the present invention.

FIG. 1 is a functional block diagram showing a system 10 for providing a network host decoy using a pseudo network protocol stack implementation 13 in accordance with the present invention. A plurality of computer systems, such as workstation 15, personal computer 16, minicomputer 17, mainframe computer 18, and supercomputer 19, and network devices, such as router 20, are interconnected via a network 11. The network 11 can be either an intranetwork, internetwork, including the Internet, or some combination of both. Other network topologies are possible. In addition, the network is preferably based on the TCP/IP suite, described above, with each computer system and network device implementing a network protocol stack, as further described below with reference to FIG. 3.

The network 11 includes at least one host computer system 12 which provides standard network services, such as database access, file and resource sharing, and the like, to the other computer systems. Operationally, to provide a network host decoy, a virtual host 12 receives service requests encapsulated within network frames via the network 11. The frames are analyzed for an attack signature or other indication of improperly attempted access by an active network security monitor which could be implemented by the virtual host 12 or some other system operating as a host on the network 11. The virtual host 12 includes a pseudo network protocol stack implementation 13 for building pseudo network packets which, when received by a requesting client or host, provide the illusion that the packets originated from another host or device, as further described below with reference to FIG. 2. The virtual host 12 maintains a database 14 for use by the pseudo network protocol stack implementation 13 in which are stored network protocol stack implementation characteristics for a plurality of heterogeneous computer systems and network devices, are identified, such as described in A. Osborne & J. D. Myers, "A Methodical Approach to Remote IP Stack Identification," Network Associates, Inc., Santa Clara, Calif. (1999), the disclosure of which is incorporated herein by reference.

In the described embodiment, a network virtual host, such as used in the CyberCop Suite of network security products, licensed by Network Associates, Inc., Santa Clara, Calif., counters an external attacker who has compromised the firewall or an illicit internal user who is improperly using the intranetwork by creating the illusion of a "honey pot" or decoy host system. The CyberCop Suite is described in "Next Generation Intrusion Detection in High Speed Networks," White Paper, Network Associates, Inc., Santa Clara, Calif., the disclosure of which is incorporated herein by reference. The virtual host masquerades as a pseudo host or network device by sending reply packets to the would-be attacker which appear to originate elsewhere. The reply packets create the illusion that the attacker has succeeded in compromising a network resource. An active network sniffer security device is then used to detect further requests to the pseudo host or network device from the attacker who is eventually identified.

As described, the individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage. Each system interconnected to the network implement a full, end-to-end, network protocol stack. The network devices can be either special purpose packet switching devices, such as a router, or general purpose computing devices, which provide the functionality of only a partial, lower layer, point-to-point network protocol stack implementation.

The virtual host 12 is an Intel Pentium-based server system running the Windows NT operating system, such as available from Dell Computers, Austin, Tex. The system is preferably equipped with 128 MB RAM, 10 GB hard drive capacity, data backup facilities, and related hardware for interconnection to the network 11. The workstation 15, personal computer 16, minicomputer 17, mainframe computer 18, supercomputer 19, and router 20 are examples of computer systems and network devices, which are commonly known in the art. Other types of server systems, including personal computers, minicomputers, mainframe computers, supercomputers, parallel computers, workstations, digital data processors and the like would also be equally suitable.

Figure 2:
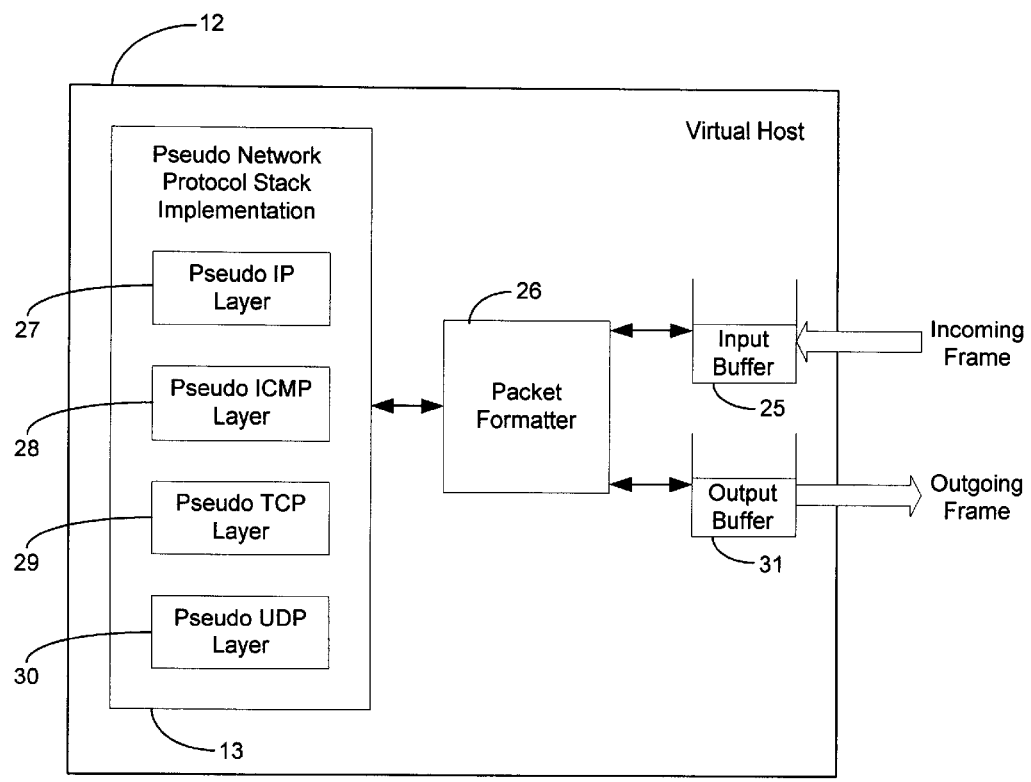
FIG. 2 is a block diagram showing the functional software modules of the virtual host of the system of FIG. 1.

FIG. 2 is a block diagram showing the functional software modules of the virtual host 12 of the system 10 of FIG. 1. Each software module is a computer program or routine written as source code in a conventional programming language, such as the C programming language, and is presented for execution by the CPU as object or byte code. The various implementations of the source code and object and byte codes can be held on a computer-readable storage medium or embodied on a transmission medium in a carrier wave.

The virtual host 12 receives an incoming frame from the network 11 into an input buffer 26. Each frame includes a plurality of encapsulated data segments originating from a successive protocol layer in the network protocol stack of the sending system. For example, a data packet originating from a web browser application would be encapsulated within a TCP segment, which in turn would be encapsulated within an IP datagram. A packet formatter 26 retrieves each frame from the input buffer 25 and analyzes the frame in a layer-by-layer manner. During the analysis, the header associated with each data segment, including any options, is processed and any recursively encapsulated data segment is forwarded to the next higher protocol layer for handling.

The packet formatter 26 uses the pseudo network protocol stack implementation 13 to create a set of encapsulated data segments for simulating a pseudo host or network device from the perspective of the lower network layers. Additional upper network layers could also be included. As implemented, the pseudo IP layer 27 builds a pseudo IP datagram; the pseudo ICMP layer 28 builds a pseudo ICMP message; the pseudo TCP layer 29 builds a pseudo TCP segment; and the pseudo UDP layer 30 builds a pseudo UDP datagram. Each of these individual data segments is encapsulated within the data segment of a recipient lower level protocol layer. The completed set of encapsulated data segments is included in an outgoing frame, which is placed into an output buffer 31 for subsequent transmission over the network 11.

Figure 3:
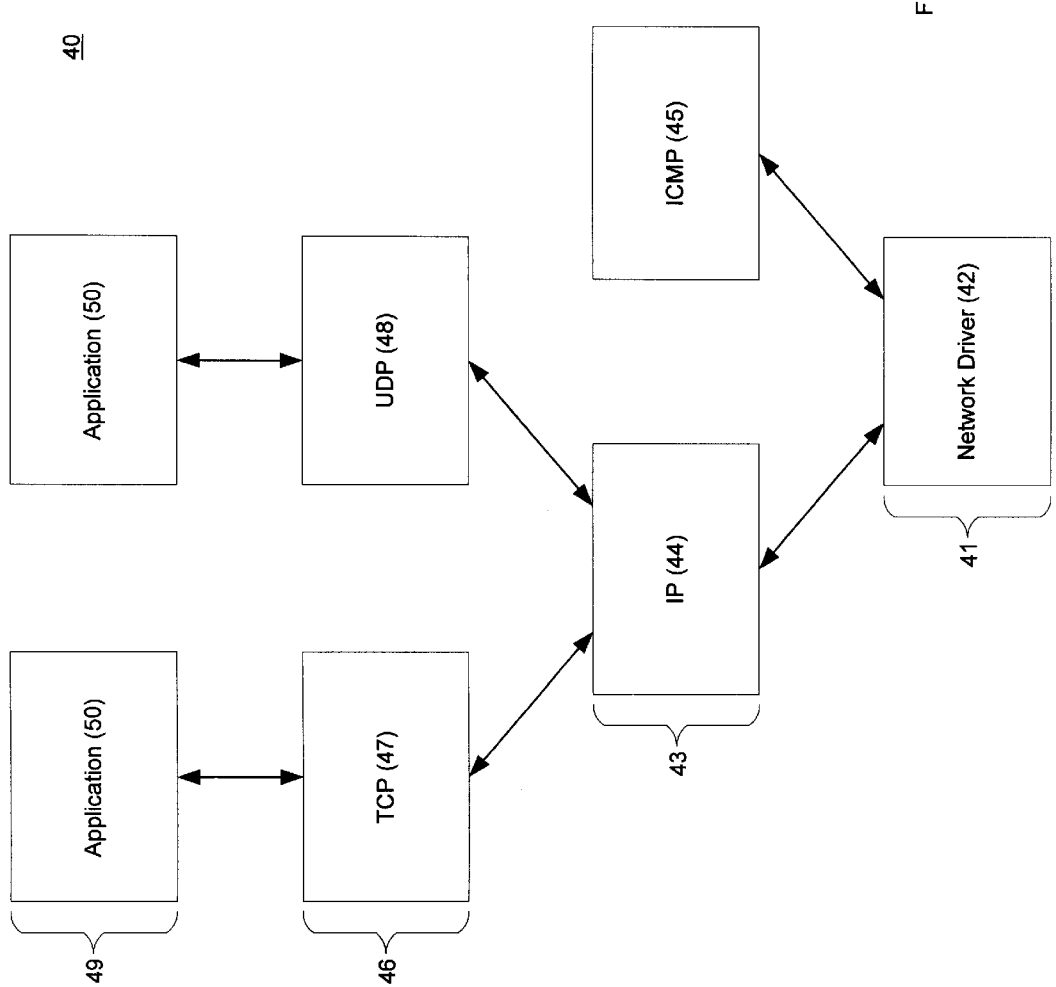
FIG. 3 is a functional block diagram showing TCP/IP network protocol stack layers.

FIG. 3 is a functional block diagram showing network protocol stack layers 40 as used in the pseudo network protocol stack implementation 13. The described embodiment is based on the TCP/IP network protocol suite, as described above, which consists of four functionally defined layers (from bottom to top): link layer 42, network layer 43, transport layer 46, and application layer 49. These layers are arranged in a hierarchical manner and information generally passes from layer to layer through a well-defined application programming although certain types of packets can be exchanged between non-successive network layers.

The link layer 42 consists of modules, such as network driver 42, which provide an interface to the physical network hardware, such as an Ethernet network interface card (NIC). Each network driver 42 is operating system and network hardware specific. The network layer 43 consists of modules responsible for the point-to-point packet routing of network frames. In particular, the Internet Protocol (IP) provides a connectionless, unreliable transmission service using IP datagrams, as further described below with reference to FIG. 4. The Internet Control Message Protocol (ICMP) 44 communicates errors and condition messages to IP 44 and higher network layer modules, as further described below with reference to FIG. 5. The transport layer 46 consists of modules responsible for end-to-end packet transmission. In particular, the Transmission Control Protocol (TCP) 46 provides a connection-based, reliable transmission service using TCP segments, as further described below with reference to FIG. 6. The User Datagram Protocol (UDP) 48 provides a connectionless, unreliable transmission service using UDP datagrams, as further described below with reference to FIG. 7. Finally, the application layer 49 consists of individual applications 50, providing such services implementing, by way of example, web browsing through the Hypertext Transport Protocol (HTTP) and file transfer through the File Transport Protocol (FTP). The present invention is primarily addressed to the network layer 43 and transport layer 46, although the methodologies presented herein are equally applicable to the other layers as well.

FIG. 4 is a data structure showing the contents of an Internet Protocol (IP) datagram 60. The IP datagram 60 includes two mandatory components, header 61 and data field 75, plus an optional options field 74. The data field 75 encapsulates any data segment received from a higher protocol layer, such as TCP 47 or UDP 48, into the IP datagram 60. The options field 74 contains a variable length list of optional information concerning security and handling restrictions, record routing, timestamps, and loose or strict source routing. The header 61 contains twelve individual fields: version 62, header length 63, type of service 64 (TOS), total length 65, identification 66, flags 67, fragment offset 68, time-to-live 69 (TTL), protocol 70, header checksum 71, source IP address 72, and destination IP address 73.

FIG. 5 is a data structure showing the contents of an Internet Control Message Protocol (ICMP) message 80. The ICMP message 80 contains four fields: type 81, code 82, checksum 83, and contents 84. There are fifteen different messages types and many of the message types are further categorized by condition code. The contents 84 depend on the message type and condition code.

Figure 6:
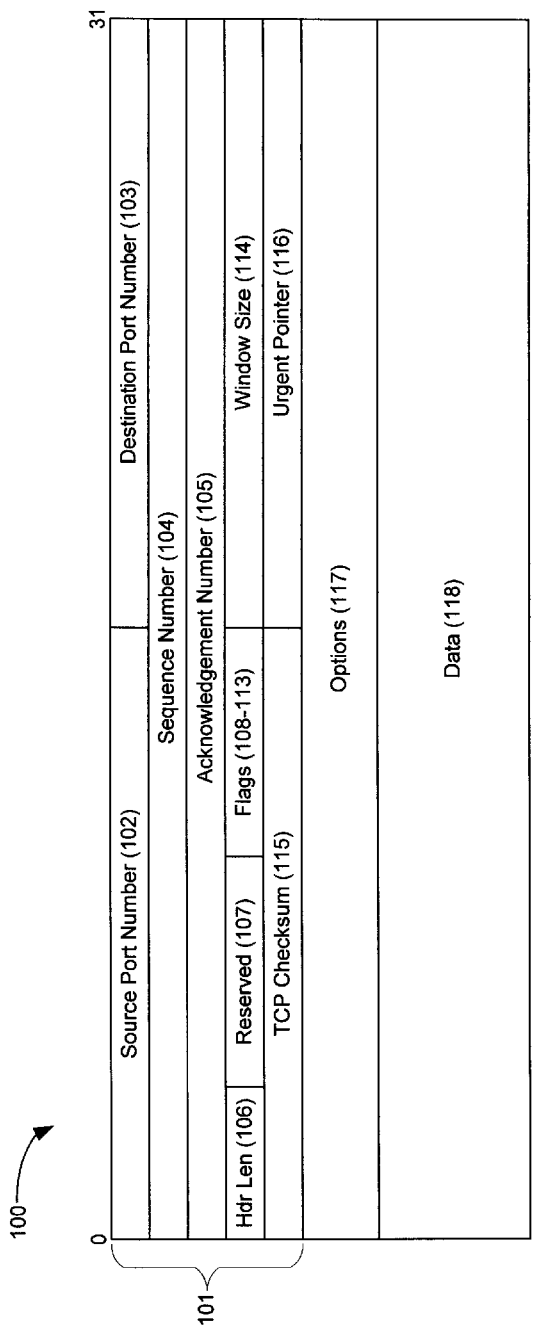
FIG. 6 is a data structure showing the contents of a Transmission Control Protocol (TCP) segment.

FIG. 6 is a data structure showing the contents of a Transmission Control Protocol (TCP) segment 100. Like the IP datagram 60, the TCP segment 100 includes two mandatory components, header 101 and data field 118, plus an optional options field 117. The data field 118 encapsulates any data segment received from a higher protocol layer, such as application 50, within the TCP segment 100. At a minimum, the options field 74 contains a variable length list of optional information concerning end of options list, no operation, and maximum segment size, although additional options are available in various versions of TCP. The header 101 contains ten individual fields: source port number 102, destination port number 103, sequence number 104, acknowledgement number 105, header length 106, a reserved field 107, flag fields 108–113, window size 114, TCP checksum 115, and urgent pointer 116. The flag fields 108–113 include an urgent pointer 108, an acknowledge number flag 109, a push flag 110, a reset flag 111, a synchronize sequence number flag 112, and a finish flag 113.

Figure 7:
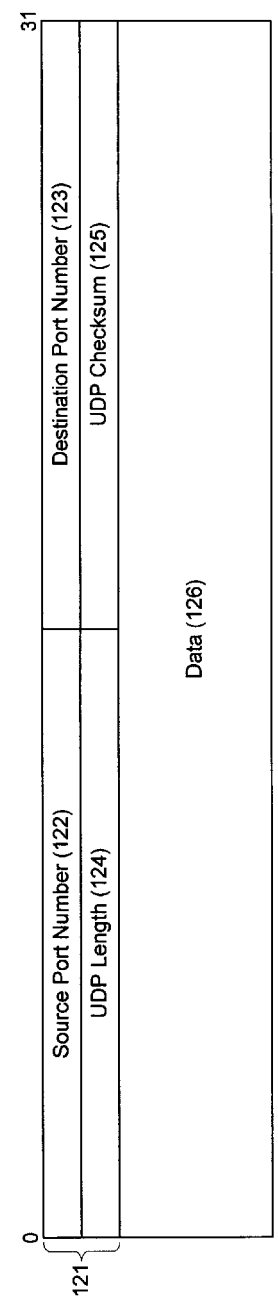
FIG. 7 is a data structure showing the contents of a User Datagram Protocol (UDP) datagram.

FIG. 7 is a data structure showing the contents of a User Datagram Protocol (UDP) datagram 120. The UDP datagram 120 includes two mandatory components, header 121 and data field 126. The data field 126 encapsulates any data segment received from a higher protocol layer, such as application 50, within the UDP datagram 120. The header 121 contains four individual fields: source port number 122, destination port number 123, UDP length 124, and UDP checksum 125. IP, ICMP, UDP, and TCP, and the contents of IP datagrams, ICMP messages, UDP datagrams, and TCP segments are further described in W. R. Stevens, "TCP/IP Illustrated," vol. 1, chs. 3, 6, 11, 17, Addison-Wesley (1994), respectively, the disclosures of which are incorporated herein by reference.

Figure 8:
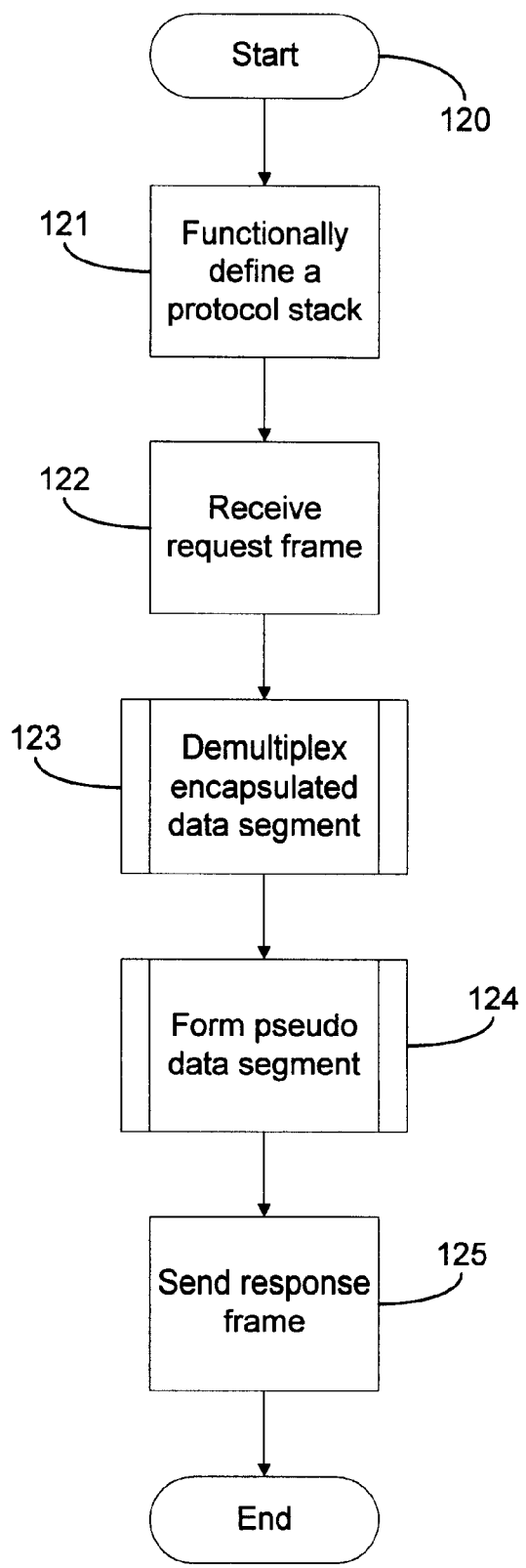
FIG. 8 is a flow diagram showing a method for providing a network host decoy using a pseudo network protocol stack implementation in accordance with the present invention.

FIG. 8 is a flow diagram showing a method 120 for providing a network host decoy using a pseudo network protocol stack implementation 12 in accordance with the present invention. First, a network protocol stack is functionally defined (block 121), typically by loading a set of device and network software drivers, which implement the desired type of network protocol, such as the TCP/IP suite. As each incoming frame is received over the network 11 (block 122), the protocol stack implementation is used by the virtual host 12 to demultiplex each data segment encapsulated within the received frame (block 123), as further described below with reference to FIG. 9. Next, a pseudo data segment is formed (block 124) for each pseudo network layer in the pseudo network protocol stack implementation 13 (shown in FIG. 2), as further described below with reference to FIG. 10. Finally, a response frame containing all of the encapsulated data segments is sent (block 125). The method then terminates.

Figure 9:
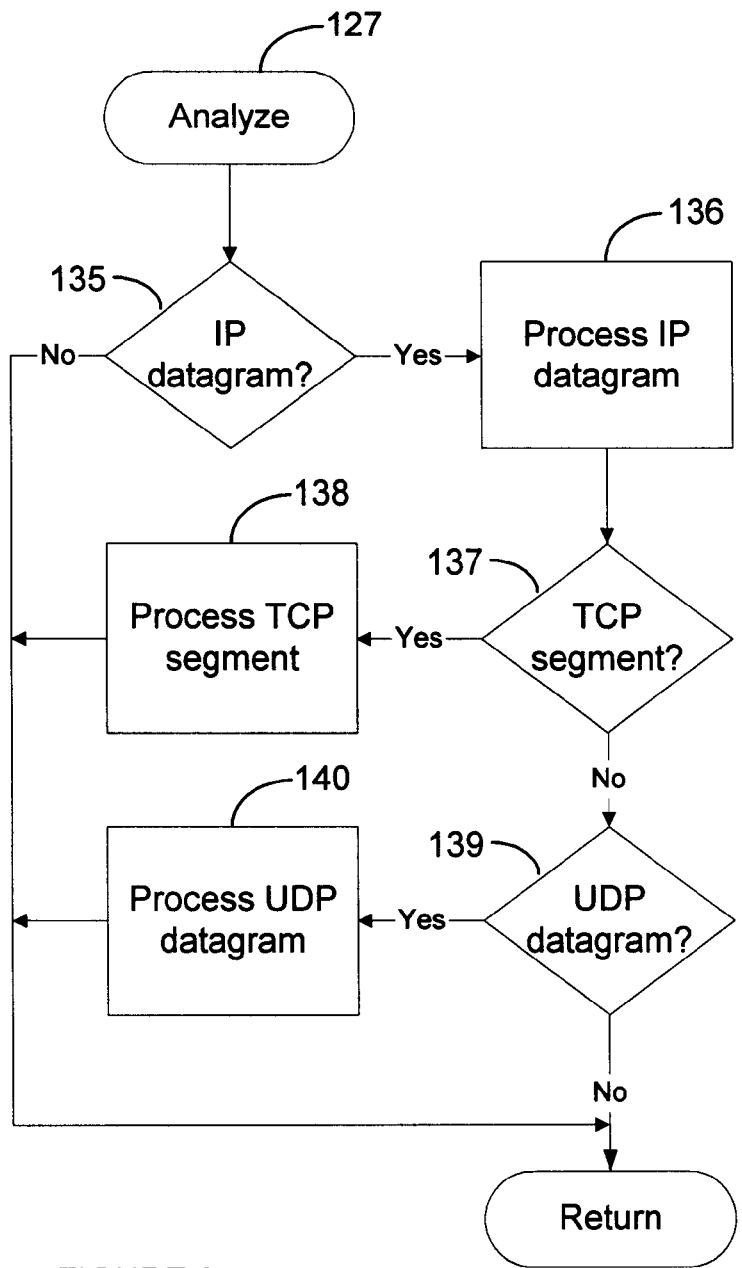
FIG. 9 is a flow diagram showing a routine for demultiplexing encapsulated data segments for use in the method of FIG. 8.

FIG. 9 is a flow diagram showing a routine for demultiplexing encapsulated data segments 127 for use in the method of FIG. 8. The purpose of this routine is to categorize each received data segment and dispatch the data segment for processing by the appropriate network layer implementation. The routine proceeds in a bottom-up manner, starting with the network layer 43 and proceeding upwards to the transport layer 46. Thus, if the data segment is an IP datagram (block 135), the header and any options in the IP datagram are processed (block 136). Otherwise, an error condition exists (block 135) and the routine returns. Upon completion of IP layer processing (block 136), the remaining encapsulated data segments are demultiplexed based on the protocol field 70 of the IP header 61 (shown in FIG. 4). Thus, if the data segment is a TCP segment (block 137), the header and any options in the TCP segment are processed (block 138). If the data segment is a UDP datagram (block 139), the header in the UDP datagram is processed (block 140). Processing by other upper network protocol layers (not shown) could also be included, such as application layer processing by an File Transfer Protocol (FTP) layer. Such upper network protocol layers would be identified by the destination port numbers 103, 123 in the TCP header 101 or UDP header 121, respectively. Upon completion of the TCP or UDP layer processing (blocks 138, 140) or if the data segments are neither a TCP segment or UDP datagram, the routine returns.

Figure 10:
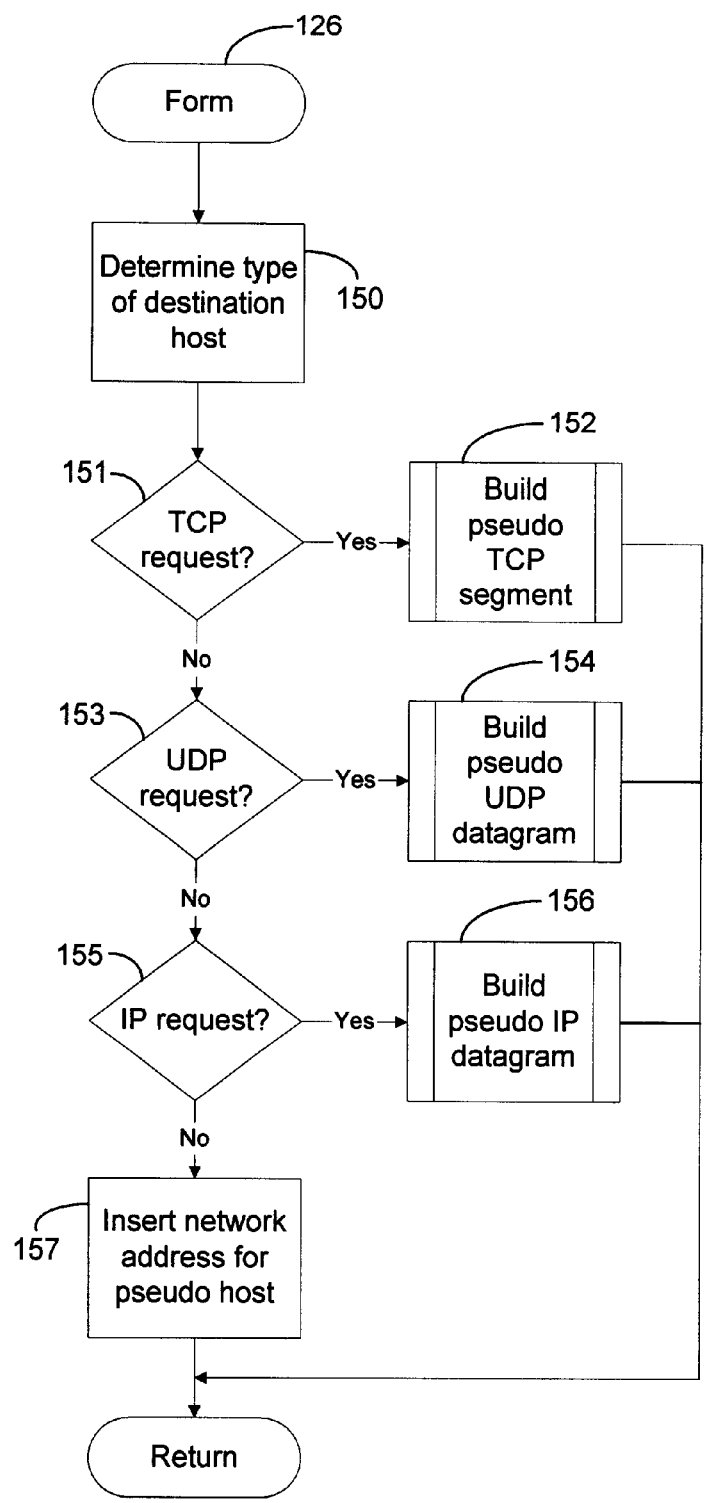
FIG. 10 is a flow diagram showing a routine for forming pseudo data segments for use in the method of FIG. 8.

FIG. 10 is a flow diagram showing the routine for forming pseudo data segments 126 for use in the method of FIG. 8. The purpose of the routine is to recursively encapsulate pseudo data segments from higher to lower network protocol layers. First, the type of destination host is determined (block 150) based on the earlier demultiplexing and processing of the received incoming frame (block 123 in FIG. 8). Thus, if the destination host includes a TCP request (block 151), a pseudo TCP segment is built (block 152), as further described below with reference to FIG. 11. Similarly, if the destination host includes a UDP request (block 153), a pseudo UDP datagram is built (block 154), as further described below with reference to FIG. 12. Finally, if the destination host includes an IP request (block 155), a pseudo IP segment is built (block 156), as further described below with reference to FIG. 13. Each pseudo protocol layer forwards the completed pseudo data segment to the next, lower pseudo protocol layer. Finally, a decoy network address for the pseudo host is inserted into the frame (block 157). The routine then returns.

Figure 11:
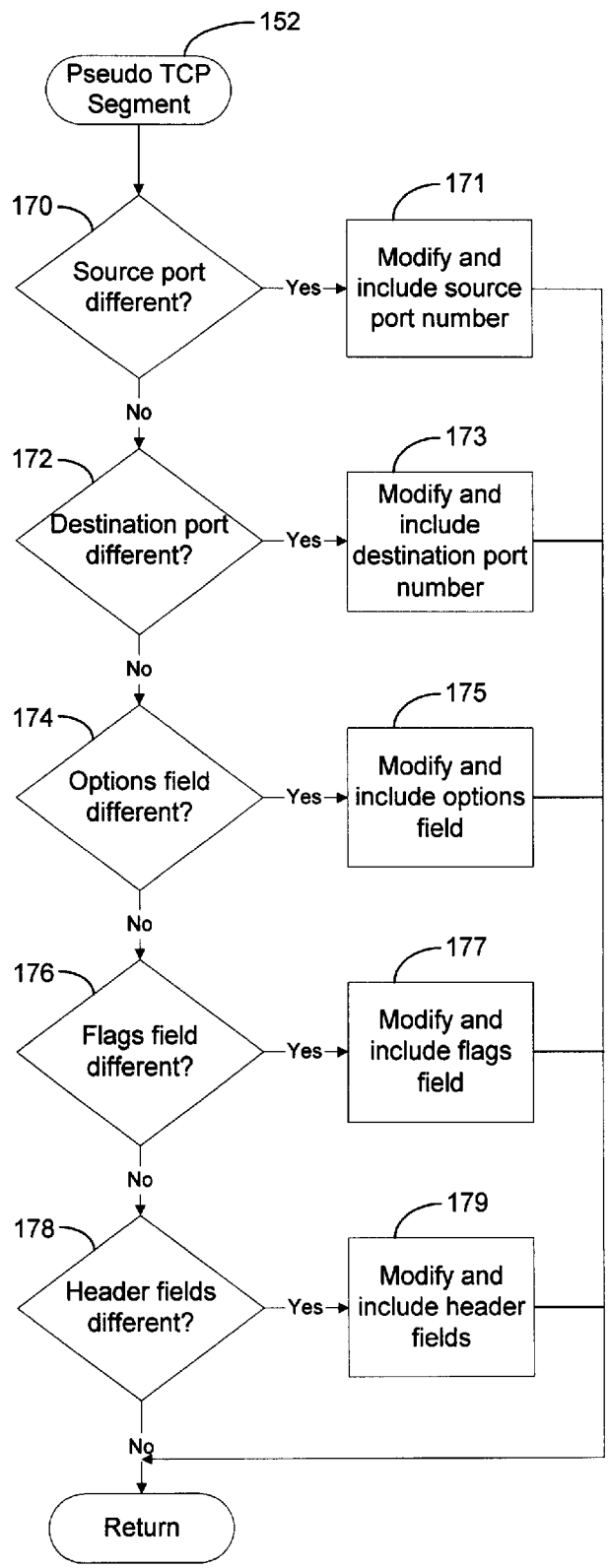
FIG. 11 is a flow diagram showing a routine for building a pseudo TCP segment for use in the method of FIG. 8.

FIG. 11 is a flow diagram showing the routine for building a pseudo TCP segment 152. The purpose of the routine is to "customize" the pseudo TCP segment with machine and operating system specific dependencies for the particular type of destination host indicated in the received incoming frame. First, if the source port number 102 is different (block 170), the source port number 102 is modified with a different source port number 102 suitable to the pseudo host (block 171). For instance, a Windows NT host generally uses port 139 for file sharing services. Similarly, if the destination port number 103 is different (block 172), the destination port number 103 is modified with a different source port number 103 suitable to the pseudo host (block 173).

Next, if the processing of the options field 117 is performed differently by the particular type of destination host (block 174), the options field 117 is modified and included in the pseudo TCP segment (block 175). Not all TCP options are supported by all systems and network devices. Likewise, if the processing of the flag fields 108–113 are processed differently by the particular type of destination host (block 176), the flag fields 108–113 are modified and included in the pseudo TCP segment (block 177). For instance, the flags are modified during the three-way handshake during the establishment of a connection. Finally, if any remaining header fields are treated differently by the virtual host (block 178), each field is modified and included in the pseudo TCP segment (block 179). The routine then returns.

Figure 12:
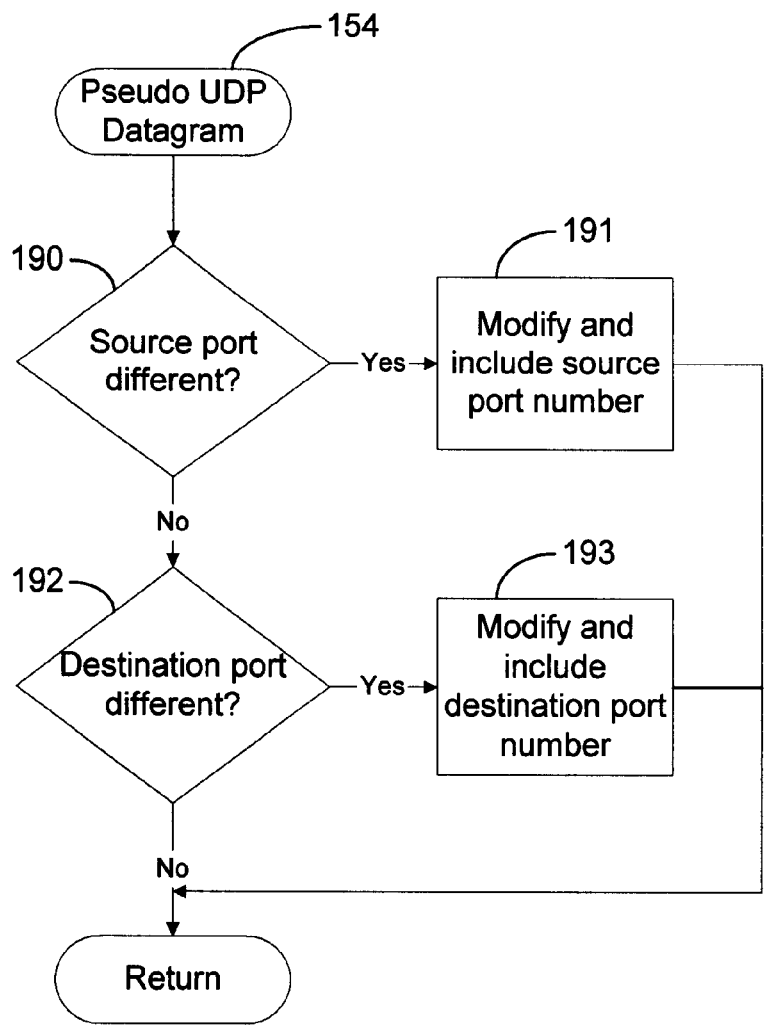
FIG. 12 is a flow diagram showing a routine for building a pseudo UDP datagram for use in the method of FIG. 8.

FIG. 12 is a flow diagram showing the routine for building a pseudo UDP datagram 154. Like the previous routine, the purpose of this routine is to "customize" the pseudo UDP datagram with machine and operating system specific dependencies for the particular type destination host indicated in the received incoming frame. First, if the source port number 102 is different (block 190), the source port number 102 is modified with a different source port number 102 suitable to the pseudo host (block 191). Similarly, if the destination port number 103 is different (block 172), the destination port number 103 is modified with a different source port number 103 suitable to the pseudo host (block 193). The routine then returns.

Figure 13:
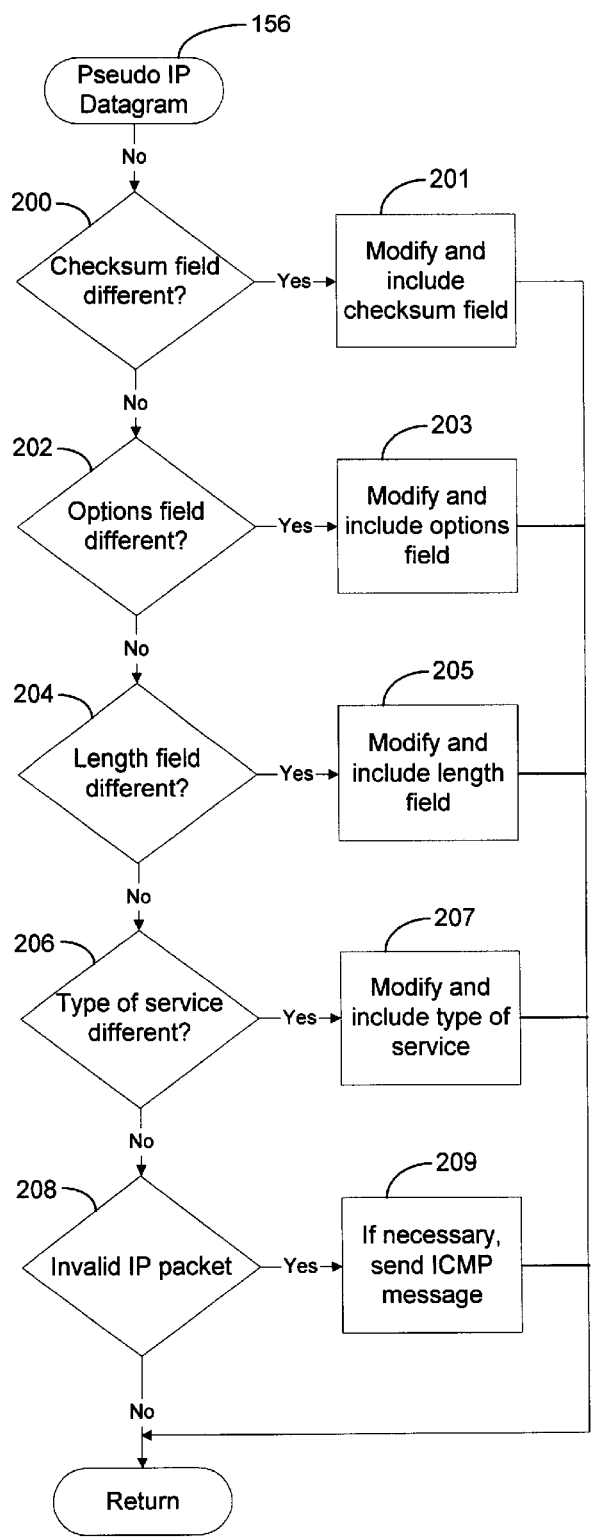
FIG. 13 is a flow diagram showing a routine for building a pseudo IP datagram for use in the method of FIG. 8.

FIG. 13 is a flow diagram showing the routine for building a pseudo IP datagram 156. The purpose of the routine is also to "customize" the pseudo IP datagram with similar machine and operating specific dependencies. First, if the checksum field is processed differently (block 200), the checksum field value is modified and included in the pseudo IP datagram (block 201). For instance, machines running the Irix operating system, a version of the Unix operating system available on systems manufactured by Silicon Graphics, Inc., Mountain View, Calif., zero out the checksum field in a packet reflection. If the processing of the options field 74 is performed differently by the particular type of destination host (block 202), the options field 117 is modified and included in the pseudo IP datagram (block 203). If the processing of either the header length field 63 or the total length field 65 is performed differently by the particular type of destination host (block 204), the appropriate length field is modified and included in the pseudo IP datagram (block 205). For instance, a widely known error occurs in versions of the Unix operating system derived from the original Berkeley Software Distribution (BSD) Unix operating system whereby an extra 20 bytes is always (erroneously) added to the header field length field 63. If the type of service 64 is different (block 206), the type of service field 64 is modified and included in the pseudo IP datagram (block 207). Finally, if the IP packet 60 is invalid (block 208), an ICMP message 80 is sent (block 209) if the type of error handling for the destination machine includes sending an ICMP message rather than ignoring or merely forwarding the IP datagram 60. The routine then returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing a network host decoy on a virtual host using a pseudo implementation of a network protocol stack, wherein the network protocol stack comprises an Internet Protocol (IP) layer, comprising:

a hierarchical network protocol stack comprising a plurality of communicatively interfaced protocol layers, each protocol layer performing a set of defined functions on data segments exchanged therebetween;

an input buffer receiving a request frame originating from a remote host, the request frame comprising a plurality of recursively encapsulated data segments which each correspond to a successive protocol layer in the network protocol stack, further comprising:

the IP layer interpreting an IP datagram encapsulated as a data segment within the request frame; and a pseudo IP layer modifying a checksum field in a header of the IP datagram and including the modified checksum field in a reply IP datagram formed as a pseudo data segments; and a packet formatter, comprising:

each protocol layer demultiplexing each encapsulated data segment in the request frame by processing a header associated with the encapsulated data segment, performing any requested network service and forwarding any recursively encapsulated portion to the next successive protocol layer;

a plurality of pseudo protocol layers corresponding to each of the protocol layers in the network protocol stack, each pseudo protocol layer forming a pseudo data segment comprising a header and data portion with the header including network protocol stack characteristics for a pseudo host different than the network protocol stack characteristics for the virtual host and recursively encapsulating each of the pseudo data segments within a response frame and inserting into the response frame a network address for the pseudo host different than the network address for the virtual host; and an output buffer sending the response frame to the remote host.

2. A system according to claim 1, wherein the network protocol stack comprises an Internet Protocol (IP) layer and an Internet Control Message Protocol (ICMP) layer, further comprising:

the IP layer interpreting an IP datagram encapsulated as a data segment within the request frame; and a pseudo ICMP layer forming an ICMP message as a pseudo data segment in response to an invalid field in a header of the IP datagram.

3. A system according to claim 1, wherein the network protocol stack comprises an Internet Protocol (IP) layer, further comprising:

the IP layer interpreting an IP datagram encapsulated as a data segment within the request frame; and a pseudo IP layer forming an IP datagram as a pseudo data segment in response to the IP datagram being invalid.

4. A system according to claim 1, wherein the network protocol stack comprises an Internet Protocol (IP) layer, further comprising:

the IP layer interpreting an IP datagram encapsulated as a data segment within the request frame; and a pseudo IP layer modifying an options field in a header of the IP datagram and including the modified options field in a reply IP datagram formed as a pseudo data segment.

5. A system according to claim 1, wherein the network protocol stack comprises an Internet Protocol (IP) layer, further comprising:

the IP layer interpreting an IP datagram encapsulated as a data segment within the request frame; and a pseudo IP layer modifying at least one of a header length field and a total length field in a header of the IP datagram and including the modified header length field and total length field in a reply IP datagram formed as a pseudo data segment.

6. A system according to claim 1, wherein the network protocol stack comprises an Internet Protocol (IP) layer, further comprising:

the IP layer interpreting an IP datagram encapsulated as a data segment within the request frame; and a pseudo IP layer modifying a type of service field in a header for each of a series of packet fragments collectively comprising the IP datagram and including the modified type of service field in a reply IP datagram formed as a series of pseudo data segments, each corresponding to one of the packet fragments.

7. A system according to claim 1, wherein the network protocol stack comprises a Transmission Control Protocol (TCP) layer, further comprising:

the TCP layer interpreting a TCP segment encapsulated as a data segment within the request frame; and an pseudo TCP layer modifying at least one of a source port number field and a destination port number field in a header of the TCP segment and including the modified at least one of a source port number field and a destination port number field in a reply TCP segment formed as a pseudo data segment.

8. A system according to claim 1, wherein the network protocol stack comprises a Transmission Control Protocol (TCP) layer, further comprising:

the TCP layer interpreting a TCP segment encapsulated as a data segment within the request frame; and a pseudo TCP layer modifying an options field in a header of the TCP segment and including the modified options field in a reply TCP segment formed as a pseudo data segment.

9. A system according to claim 1, wherein the network protocol stack comprises a Transmission Control Protocol (TCP) layer, further comprising:

the TCP layer interpreting a TCP segment encapsulated as a data segment within the request frame;

a pseudo TCP layer modifying a flags field in a header of the TCP segment and including the modified flags field in a synchronize TCP segment formed as a pseudo data segment;

the TCP layer interpreting a second TCP segment encapsulated as a data segment within a subsequent request frame; and the pseudo TCP layer modifying a flags field in a header of the second TCP segment and including the modified flags field in an acknowledgement TCP segment formed as a pseudo data segment.

10. A system according to claim 1, wherein the network protocol stack comprises a Transmission Control Protocol (TCP) layer, further comprising:

the TCP layer interpreting a TCP segment encapsulated as a data segment within the request frame; and a pseudo TCP layer modifying at least one field in a header of the TCP segment selected from the group consisting of a sequence number field, an acknowledgement number field, a reserved field, and a window size field and including the modified at least one field in a reply TCP segment formed as a pseudo data segment.

11. A system according to claim 1, wherein the network protocol stack comprises a User Datagram Protocol (UDP) layer, further comprising:

the UDP layer interpreting a UDP datagram encapsulated as a data segment within the request frame; and a pseudo UDP layer modifying at least one of a source port number field and a destination port number field in a header of the UDP datagram and including the modified at least one of a source port number field and a destination port number field in a reply UDP datagram formed as a pseudo data segment.

12. A method for providing a network host decoy on a virtual host using a pseudo implementation of a network protocol stack, wherein the network protocol stack comprises an Internet Protocol (IP) layer, comprising:

functionally defining a hierarchical network protocol stack comprising a plurality of communicatively interfaced protocol layers;

receiving a request frame originating from a remote host the request frame comprising a plurality of recursively encapsulated data segments which each correspond to a successive protocol layer in the network protocol stack, further comprising:

interpreting an IP datagram encapsulated as a data segment within the request frame;

modifying a checksum field in a header of the IP datagram; and including the modified checksum field in a reply IP datagram formed as a pseudo data segment; and demultiplexing, at each protocol layer, each encapsulated data segment in the request frame by processing a header associated with the encapsulated data segment, performing any requested network service and forwarding any recursively encapsulated portion to the next successive protocol layer;

forming a plurality of pseudo data segments corresponding to each of the protocol layers in the network protocol stack, each pseudo data segment comprising a header and data portion with the header including network protocol stack characteristics for a pseudo host different than the network protocol stack characteristics for the virtual host;

recursively encapsulating each of the pseudo data segments within a response frame and inserting into the response frame a network address for the pseudo host different than the network address for the virtual host; and sending the response frame to the remote host.

13. A method according to claim 12, wherein the network protocol stack comprises an Internet Protocol (IP) layer and an Internet Control Message Protocol (ICMP) layer, further comprising:

interpreting an IP datagram encapsulated as a data segment within the request frame; and forming an ICMP message as a pseudo data segment in response to an invalid field in a header of the IP datagram.

14. A method according to claim 12, wherein the network protocol stack comprises an Internet Protocol (IP) layer, further comprising:

interpreting an IP datagram encapsulated as a data segment within the request frame; and forming an IP datagram as a pseudo data segment in response to the IP datagram being invalid.

15. A method according to claim 12, wherein the network protocol stack comprises an Internet Protocol (IP) layer, further comprising:

interpreting an IP datagram encapsulated as a data segment within the request frame;

modifying an options field in a header of the IP datagram; and including the modified options field in a reply IP datagram formed as a pseudo data segment.

16. A method according to claim 12, wherein the network protocol stack comprises an Internet Protocol (IP) layer, further comprising:

interpreting an IP datagram encapsulated as a data segment within the request frame;

modifying at least one of a header length field and a total length field in a header of the IP datagram; and including the modified header length field and total length field in a reply IP datagram formed as a pseudo data segment.

17. A method according to claim 12, wherein the network protocol stack comprises an Internet Protocol (IP) layer, further comprising:

interpreting an IP datagram encapsulated as a data segment within the request frame;

modifying a type of service field in a header for each of a series of packet fragments collectively comprising the IP datagram; and including the modified type of service field in a reply IP datagram formed as a series of pseudo data segments, each corresponding to one of the packet fragments.

18. A method according to claim 12, wherein the network protocol stack comprises a Transmission Control Protocol (TCP) layer, further comprising:

interpreting a TCP segment encapsulated as a data segment within the request frame;

modifying at least one of a source port number field and a destination port number field in a header of the TCP segment; and including the modified at least one of a source port number field and a destination port number field in a reply TCP segment formed as a pseudo data segment.

19. A method according to claim 12, wherein the network protocol stack comprises a Transmission Control Protocol (TCP) layer, further comprising:

interpreting a TCP segment encapsulated as a data segment within the request frame;

modifying an options field in a header of the TCP segment; and including the modified options field in a reply TCP segment formed as a pseudo data segment.

20. A method according to claim 12, wherein the network protocol stack comprises a Transmission Control Protocol (TCP) layer, further comprising:

interpreting a TCP segment encapsulated as a data segment within the request frame;

modifying a flags field in a header of the TCP segment;

including the modified flags field in a synchronize TCP segment formed as a pseudo data segment;

interpreting a second TCP segment encapsulated as a data segment within a subsequent request frame;

modifying a flags field in a header of the second TCP segment; and including the modified flags field in an acknowledgement TCP segment formed as a pseudo data segment.

21. A method according to claim 12, wherein the network protocol stack comprises a Transmission Control Protocol (TCP) layer, further comprising:

interpreting a TCP segment encapsulated as a data segment within the request frame;

modifying at least one field in a header of the TCP segment selected from the group consisting of a sequence number field, an acknowledgement number field, a reserved field, and a window size field; and including the modified at least one field in a reply TCP segment formed as a pseudo data segment.

22. A method according to claim 12, wherein the network protocol stack comprises a User Datagram Protocol (UDP) layer, further comprising:
   interpreting a UDP datagram encapsulated as a data segment within the request frame;
   modifying at least one of a source port number field and a destination port number field in a header of the UDP datagram; and
   including the modified at least one of a source port number field and a destination port number field in a reply UDP datagram formed as a pseudo data segment.

23. A computer-readable storage medium holding code for providing a network host decoy on a virtual host using a pseudo implementation of a network protocol stack, wherein the network protocol stack comprises an Internet Protocol (IP) layer, comprising:
   functionally defining a hierarchical network protocol stack comprising a plurality of communicatively interfaced protocol layers;
   receiving a request frame originating from a remote host, the request frame comprising a plurality of recursively encapsulated data segments which each correspond to a successive protocol layer in the network protocol stack, further comprising:
      interpreting an IP datagram encapsulated as a data segment within the request frame;
      modifying a checksum field in a header of the IP datagram; and
      including the modified checksum field in a reply IP datagram formed as a pseudo data segment; and
   demultiplexing, at each protocol layer, each encapsulated data segment in the request frame by processing a header associated with the encapsulated data segment, performing any requested network service and forwarding any recursively encapsulated portion to the next successive protocol layer;
   forming a plurality of pseudo data segments corresponding to each of the protocol layers in the network protocol stack, each pseudo data segment comprising a header and data portion with the header including network protocol stack characteristics for a pseudo host different than the network protocol stack characteristics for the virtual host;
   recursively encapsulating each of the pseudo data segments within a response frame and inserting into the response frame a network address for the pseudo host different than the network address for the virtual host; and
   sending the response frame to the remote host.

24. A storage medium according to claim 23, wherein the network protocol stack comprises an Internet Protocol (IP) layer and an Internet Control Message Protocol (ICMP) layer, further comprising:
   interpreting an IP datagram encapsulated as a data segment within the request frame; and
   forming an ICMP message as a pseudo data segment in response to an invalid field in a header of the IP datagram.

25. A storage medium according to claim 23, wherein the network protocol stack comprises an Internet Protocol (IP) layer, further comprising:
   interpreting an IP datagram encapsulated as a data segment within the request frame; and
   forming an IP datagram as a pseudo data segment in response to the IP datagram being invalid.

26. A storage medium according to claim 23, wherein the network protocol stack comprises an Internet Protocol (IP) layer, further comprising:
   interpreting an IP datagram encapsulated as a data segment within the request frame;
   modifying an options field in a header of the IP datagram; and
   including the modified options field in a reply IP datagram formed as a pseudo data segment.

27. A storage medium according to claim 23, wherein the network protocol stack comprises an Internet Protocol (IP) layer, further comprising:
   interpreting an IP datagram encapsulated as a data segment within the request frame;
   modifying at least one of a header length field and a total length field in a header of the IP datagram; and
   including the modified header length field and total length field in a reply IP datagram formed as a pseudo data segment.

28. A storage medium according to claim 23, wherein the network protocol stack comprises an Internet Protocol (IP) layer, further comprising:
   interpreting an IP datagram encapsulated as a data segment within the request frame;
   modifying a type of service field in a header for each of a series of packet fragments collectively comprising the IP datagram; and
   including the modified type of service field in a reply IP datagram formed as a series of pseudo data segments, each corresponding to one of the packet fragments.

29. A storage medium according to claim 23, wherein the network protocol stack comprises a Transmission Control Protocol (TCP) layer, further comprising:
   interpreting a TCP segment encapsulated as a data segment within the request frame;
   modifying at least one of a source port number field and a destination port number field in a header of the TCP segment; and
   including the modified at least one of a source port number field and a destination port number field in a reply TCP segment formed as a pseudo data segment.

30. A storage medium according to claim 23, wherein the network protocol stack comprises a Transmission Control Protocol (TCP) layer, further comprising:
   interpreting a TCP segment encapsulated as a data segment within the request frame;
   modifying an options field in a header of the TCP segment; and
   including the modified options field in a reply TCP segment formed as a pseudo data segment.

31. A storage medium according to claim 23, wherein the network protocol stack comprises a Transmission Control Protocol (TCP) layer, further comprising:
   interpreting a TCP segment encapsulated as a data segment within the request frame;
   modifying a flags field in a header of the TCP segment;
   including the modified flags field in a synchronize TCP segment formed as a pseudo data segment;
   interpreting a second TCP segment encapsulated as a data segment within a subsequent request frame;
   modifying a flags field in a header of the second TCP segment; and including the modified flags field in an acknowledgement TCP segment formed as a pseudo data segment.

32. A storage medium according to claim 23, wherein the network protocol stack comprises a Transmission Control Protocol (TCP) layer, further comprising:

interpreting a TCP segment encapsulated as a data segment within the request frame;

modifying at least one field in a header of the TCP segment selected from the group consisting of a sequence number field, an acknowledgement number field, a reserved field, and a window size field; and including the modified at least one field in a reply TCP segment formed as a pseudo data segment.

33. A storage medium according to claim 23, wherein the network protocol stack comprises a User Datagram Protocol (UDP) layer, further comprising:

interpreting a UDP datagram encapsulated as a data segment within the request frame;

modifying at least one of a source port number field and a destination port number field in a header of the UDP datagram; and including the modified at least one of a source port number field and a destination port number field in a reply UDP datagram formed as a pseudo data segment.

\* \* \* \* \*